United States Patent
He et al.

(10) Patent No.: US 12,382,507 B2
(45) Date of Patent: Aug. 5, 2025

(54) ENHANCEMENTS FOR REDUCED CAPABILITY NEW RADIO DEVICES

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 17/823,226

(22) Filed: Aug. 30, 2022

(65) Prior Publication Data
US 2023/0042274 A1    Feb. 9, 2023

Related U.S. Application Data

(63) Continuation of application No. 17/760,034, filed as application No. PCT/CN2021/111004 on Aug. 5, 2021.

(51) Int. Cl.
*H04W 8/22*    (2009.01)
*H04W 48/02*   (2009.01)
*H04W 48/12*   (2009.01)
*H04W 74/0833* (2024.01)

(52) U.S. Cl.
CPC ....... *H04W 74/0841* (2013.01); *H04W 48/02* (2013.01)

(58) Field of Classification Search
CPC .. H04W 74/0841; H04W 48/02; H04W 48/12
See application file for complete search history.

(56) References Cited

U.S. PATENT DOCUMENTS

| | | | |
|---|---|---|---|
| 2021/0058971 A1* | 2/2021 | MolavianJazi | H04B 17/318 |
| 2021/0227451 A1 | 7/2021 | Babei | |
| 2021/0329701 A1* | 10/2021 | Lei | H04W 74/0833 |

(Continued)

FOREIGN PATENT DOCUMENTS

| | | | |
|---|---|---|---|
| WO | 2021/129555 | 7/2021 | |
| WO | 2021/147580 | 7/2021 | |
| WO | WO-2021141527 A1 * | 7/2021 | ............ H04W 72/51 |

OTHER PUBLICATIONS

3GPP TSG RAN WG1#105-e, R1-2104369 Title: Higher layer support for Redcap (Year: 2021).*

(Continued)

*Primary Examiner* — Faruk Hamza
*Assistant Examiner* — Abusayeed M Haque
(74) *Attorney, Agent, or Firm* — Fay Kaplun & Marcin, LLP

(57) ABSTRACT

A user equipment (UE) is configured to receive a system information block (SIB) from a base station and transmit an indication of a reduced capability (redcap) device type to the base station during a random access procedure, wherein the indication is associated with a UE configuration comprising one or more UE complexity reduction features.

18 Claims, 11 Drawing Sheets

(56) References Cited

U.S. PATENT DOCUMENTS

| | | | |
|---|---|---|---|
| 2022/0312530 A1* | 9/2022 | Turtinen | H04W 76/10 |
| 2022/0369365 A1* | 11/2022 | Sakhnini | H04W 8/24 |
| 2022/0377798 A1* | 11/2022 | Chien | H04W 76/18 |
| 2022/0417880 A1* | 12/2022 | Priyanto | H04W 72/046 |
| 2023/0038753 A1 | 2/2023 | Tan et al. | |
| 2023/0189271 A1* | 6/2023 | Liu | H04W 76/10 |
| | | | 455/452.1 |
| 2023/0209542 A1* | 6/2023 | Wang | H04L 5/0053 |
| | | | 370/329 |

OTHER PUBLICATIONS

3GPP TSG RAN WG#105-e, R1-2104369 Title:Higher layer support for Redcap (Year: 2021).*

3GPP TSG-RAN WG2#115e, R2-2108138 Title:General aspects of RACH indication and partitioning (Year: 2021).*

Sierra Wireless SA, "Methods for barring and for capability reporting", 3GPP TSG RAN WG2 Meeting #114-e, R2-2105014, May 11, 2021, 2 sheets.

Xiaomi Communications, "Discussion on Identification and UE access restrictions for RedCap devices", 3GPP TSG RAN WG2 Meeting #114-e, R2-2105072, May 11, 2021, 3 sheets.

Qualcomm Incorporated, "Access and camping restriction for RedCap UEs", 3GPP TSG RAN WG2 Meeting #114-e, R2-2104775, May 11, 2021, 6 sheets.

Qualcomm Incorporated, "BW Reduction for RedCap UE", 3GPP TSG RAN WG1 Meeting #105, R1-2104677, May 12, 2021, 17 sheets.

Ericsson, "Reduced maximum UE bandwidth for RedCap", 3GPP TSG-RAN WG1 Meeting #104-bis-e, Tdoc R1-2102722, Apr. 7, 2021, 17 sheets.

Moderator et al., "Summary #1 of email discussion on initial access aspect of NR extension up to 71 GHz", 3GPP TSG RAN WG1 Meeting #104-e, R1-2101827, Jan. 27, 2021, 53 sheets.

* cited by examiner

| | ASN.1 IE | Values |
|---|---|---|
| Non-Redcap UEs | *totalNumberOfRA-Preambles* | 32 |
| | *NumberOfRA-PreamblesGroupA* | 20 |
| | *ssb-perRACH-OccasionAndCB-PreamblesPerSSB* | <one, 28> |
| Redcap UEs | *totalNumberOfRA-Preambles-Redcap* | 28 |
| | *NumberOfRA-PreamblesGroupA-Redcap* | 8 |
| | *ssb-perRACH-OccasionAndCB-PreamblesPerSSB-Redcap* | <two, 12> |

Table 900

| Parameters/IEs | | Values |
|---|---|---|
| Non-Redcap | totalNumberOfRA-Preambles | 24 |
| | ssb-perRACH-OccasionAndCB-PreamblesPerSSB | (One, n16) |
| | totalNumberOfRA-Preambles-CE | n16 |
| Redcap | totalNumberOfRA-Preambles-Redcap | 12 |
| | ssb-perRACH-OccasionAndCB-PreamblesPerSSB-Redcap | (One, n8) |
| | totalNumberOfRA-Preambles-Redcap-CE | n8 |

Table 1100

Fig. 11

ENHANCEMENTS FOR REDUCED CAPABILITY NEW RADIO DEVICES

TECHNICAL FIELD

This application relates generally to wireless communication systems, and in particular relates to enhancements for reduced capability new radio devices.

A new radio (NR) network may support reduced capability (redcap) devices. Generally, a redcap device is not configured with the same features as non-redcap devices. For example, compared to a legacy NR user equipment (UE), a redcap device may have a lower maximum bandwidth and/or be configured for half duplex (HD) frequency division duplex (FDD) operation. These types of features provide cost and/or complexity reduction benefits.

SUMMARY

Some exemplary embodiments are related to a processor of a user equipment (UE) configured to perform operations. The operations include receiving a system information block (SIB) from a base station and transmitting an indication of a reduced capability (redcap) device type to the base station during a random access procedure, wherein the indication is associated with a UE configuration comprising one or more UE complexity reduction features.

Other exemplary embodiments are related to a processor of a base station configured to perform operations. The operations include transmitting a system information block (SIB) to one or more user equipments (UEs) and receiving an indication of a reduced capability (redcap) device type from a UE during a random access procedure, wherein the indication is associated with a UE configuration comprising one or more UE complexity reduction features.

BRIEF DESCRIPTION OF THE DRAWINGS

FIG. 11 shows a table of an example set of parameters for configuring how preambles within an RO are to be split among redcap devices with and without CE and non-redcap devices with and without CE according to various exemplary embodiments.

DETAILED DESCRIPTION

Figure 1:
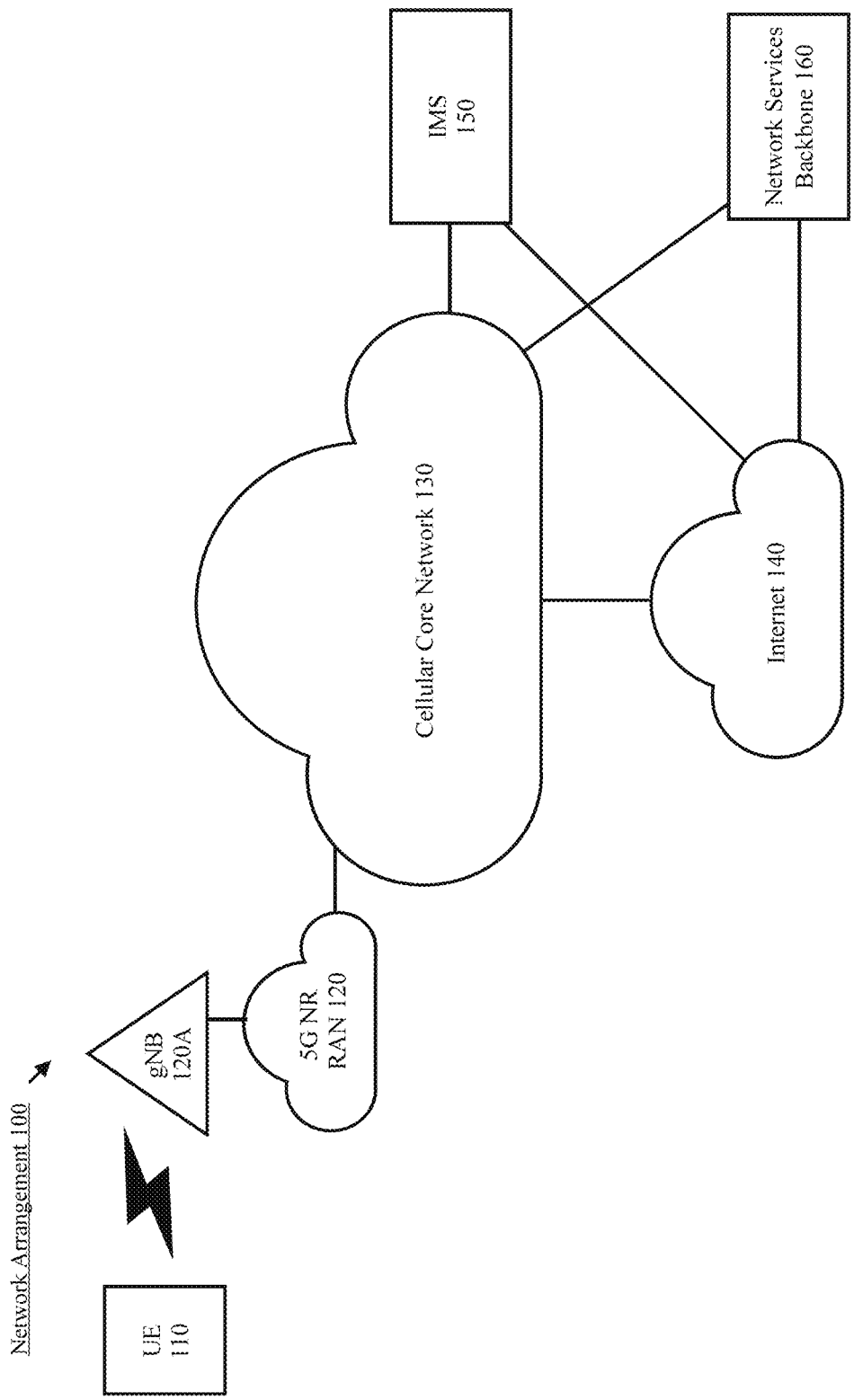
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to improving support for reduced capability (redcap) new radio (NR) devices.

The exemplary embodiments are described with regard to a redcap device. The term "redcap device" generally refers to a third generation partnership program (3GPP) concept for NR devices that have a lower cost and/or complexity compared to legacy NR devices. In some instances, a redcap device may be characterized as a device with lower end capabilities relative to release 16 enhanced mobile broadband (eMBB) devices and ultra-reliable low latency communication (URLLC) devices. To provide some specific examples, a redcap device may be associated with use cases such as, but not limited to, industrial wireless sensors, video surveillance and wearables.

Redcap devices may be configured with complexity reduction features such as, but not limited to, a lower maximum bandwidth compared to legacy NR devices, a reduced number of antenna branches compared to legacy NR devices, half-duplex (HD) frequency division duplex (FDD) capabilities, relaxed processing time compared to legacy NR devices and relaxed processing capability compared to legacy NR devices. These features may provide cost and/or complexity reduction benefits. However, any reference to a redcap device having a particular complexity reduction feature is merely provided for illustrative purposes. There may be different redcap device types and different networks may define redcap devices using different complexity reduction features.

Throughout this description, the terms "user equipment (UE)," "redcap device" and "redcap UE" may be used interchangeably to represent any electronic component that may establish a connection to a network and is equipped with capabilities that may be characterized as 3GPP NR redcap device capabilities. Therefore, the terms "UE," "redcap device" and "redcap UE" as described herein are not used to represent any type of UE. Instead, these terms are used to identify a particular a NR UE that is distinct from a non-redcap device (e.g., a legacy NR UE, etc.). The exemplary embodiments are configured to address issues related to specific aspects of redcap devices (or devices with similar reduced capabilities).

Some of the exemplary embodiments described herein relate to implementing dedicated redcap resources and/or resources that may be shared by redcap and non-redcap devices. Throughout this description, the terms "non-redcap device," "non-redcap UE" and "legacy NR UE" may be used interchangeably to represent any 3GPP NR device excluding 3GPP NR redcap devices.

In one aspect, the exemplary embodiments introduce techniques for indicating whether a particular cell and/or frequency is configured to provide network access to redcap devices. These exemplary redcap access control techniques provide an adequate balance between redcap device power consumption, cost reduction, implementation feasibility and network performance.

It may be beneficial for a redcap device to explicitly identify itself as a redcap device through an early indication. Accordingly, the exemplary embodiments introduce techniques that enable the redcap UE to explicitly identify itself during a random access procedure. These exemplary techniques provide an adequate balance between redcap device power consumption, cost reduction, implementation feasibility and network performance.

Specific examples of these exemplary access control and redcap device identification techniques will be provided in detail below. The exemplary techniques may be used in conjunction with other currently implemented NR redcap mechanisms, future implementations of NR redcap mechanisms or independently from other NR redcap mechanisms.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, Internet of Things (IoT) devices, wearables (e.g., medical devices, augmented reality goggles, virtual reality googles, smart watches, etc.), industrial wireless sensors, video surveillance devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
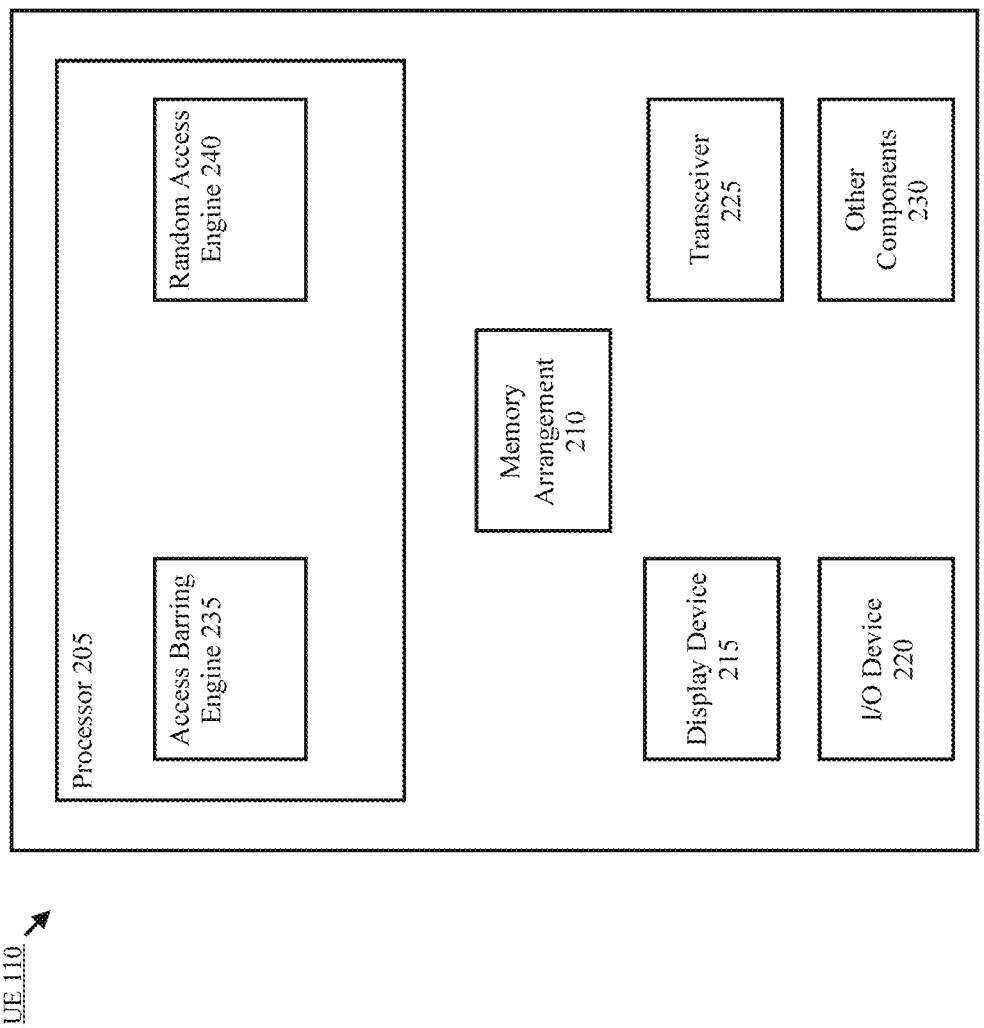
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an access barring engine 235 and a random access engine 240. The access barring engine 235 may perform various operations related to determining whether access to a cell and/or frequency is permitted by the redcap device. The random access engine 240 may perform various operations related to performing a random access procedure such as, but not limited to, selecting a physical random access channel (PRACH) resource configured for redcap devices and providing an explicit indication that the UE 110 is a redcap device.

The above referenced engines 235, 240 being applications (e.g., a program) executed by the processor 205 is merely provided for illustrative purposes. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
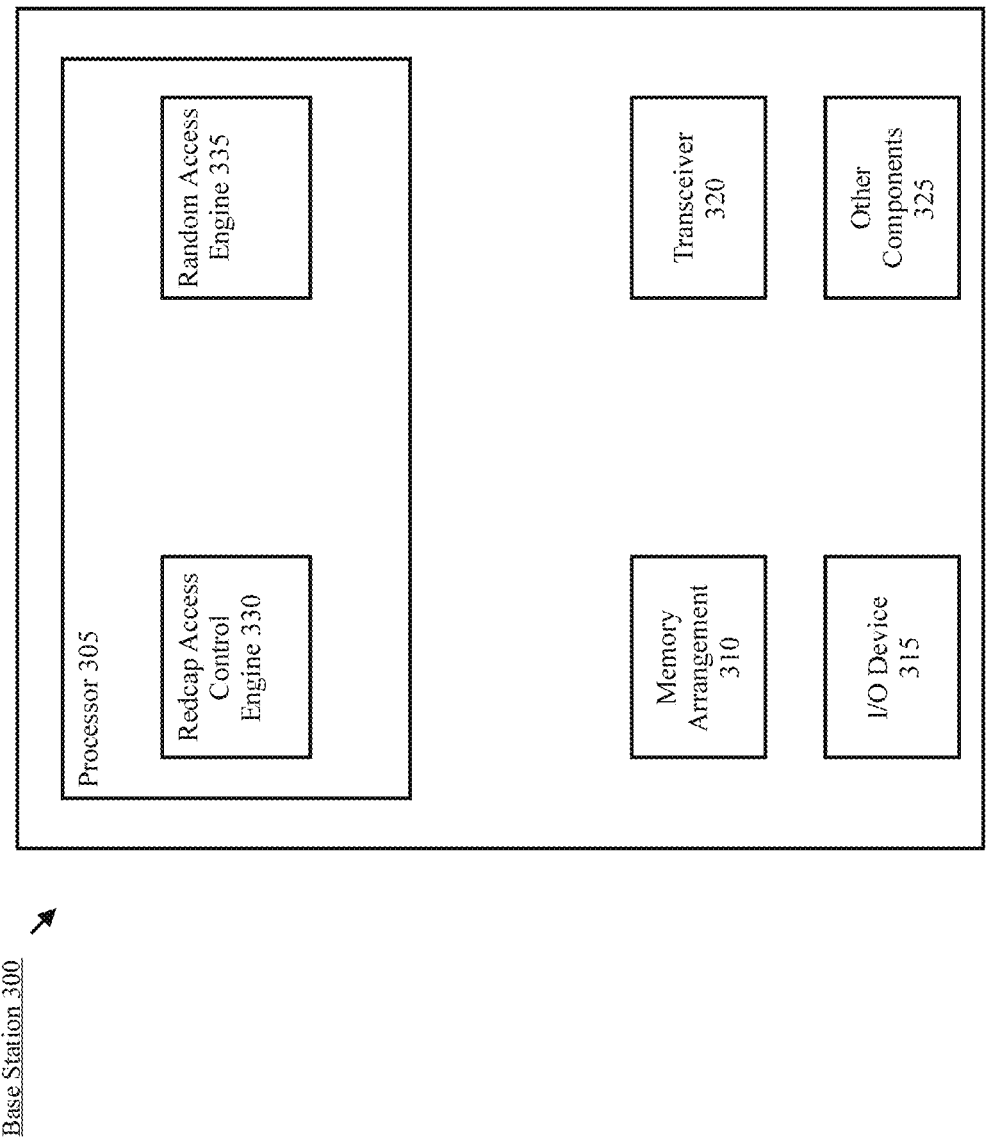
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 300. For example, the engines may include a redcap access control engine 330 and a random access engine 335. The redcap access control engine 330 may perform various operations related to indicating whether the base station 300 and/or a frequency band on which the base station 300 operates is configured to provide network access to redcap devices. The random access engine 335 may perform various operations related to random access procedures including, but not limited to, determining whether a device is a redcap device or a non-redcap device and indicating whether certain features related to explicit redcap device identification are enabled or disabled.

The above noted engines 330, 335 each being an application (e.g., a program) executed by the processor 305 is only exemplary. The functionality associated with the engines 330, 335 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

As will be described in more detail below, the exemplary embodiments introduce various ways in which the UE 110 may identify itself as a redcap device to the network. There may be multiple different redcap device types. For instance, the total population of redcap devices may be categorized as a first type of redcap device or a second type of redcap device that is distinct from the first type of redcap device.

Throughout this description, to illustrate the concept of different redcap device types, reference may be made to "redcap device type 1" and "redcap device type 2." However, these terms are merely provided for illustrative purposes. The exemplary embodiments may utilize any type of labeling or classifying to distinguish between different redcap device types. In addition, those skilled in the art will understand how the exemplary concepts described herein may apply to scenarios in which there is only one redcap device type and scenarios in which there are more than two redcap device types.

From the perspective of the network, a UE may be considered a redcap device type based on one or more UE complexity reduction features. UE complexity reduction features may include, but are not limited to, a maximum bandwidth, a number of receive (RX) antenna branches, a maximum number of downlink multiple input multiple output (MIMO) layers, a maximum downlink modulation order (e.g., quadrate amplitude modulation (QAM)) and HD FDD capabilities. Each redcap device type definition may be hard encoded into a protocol or standard or specification such that when the UE 110 indicates or reports a redcap device type to the network, the network is aware of the UE complexity reduction features and/or physical layer parameter values associated with the redcap device type.

In one approach, a redcap device type may be defined based on a maximum bandwidth (e.g., 20 megahertz (MHz) for FR1, 100 MHz for FR2, etc.). Thus, in this approach, the only UE complexity reduction feature that is inferred by the network when the UE 110 identifies itself as a particular type of redcap device is the maximum bandwidth. This may ensure that the network knows the appropriate bandwidth for message 3 (Msg3) and message 4 (Msg4) scheduling during initial access. Other relevant UE complexity reduction features may be reported to the network via UE capability information.

In another approach, a redcap device type may be defined based on a set of two or more UE complexity reduction features that are supported by the redcap device type. To provide one example, a redcap device type 1 may support a maximum bandwidth of (w) MHz for FR1 and (x) MHz for FR2, a maximum modulation order of (y)QAM, HD FDD capabilities, time division duplex (TDD) capabilities, and a minimum number (z) of RX branches. Thus, when the UE 110 identifies itself as this type of redcap device, the network may infer that the UE 110 is configured with the set of UE complexity reduction features and/or physical layer parameter values associated with the redcap device type.

Figure 4:
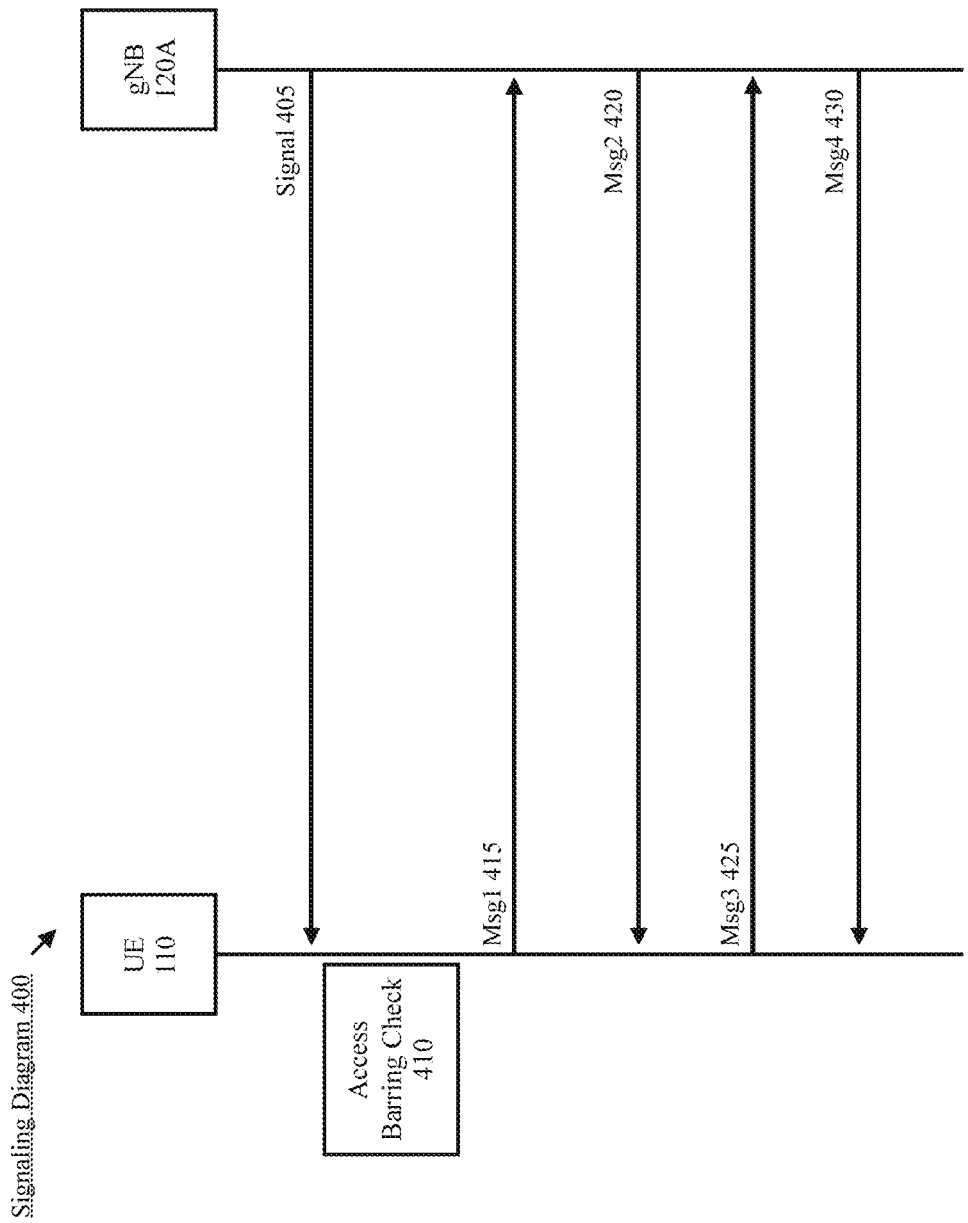
FIG. 4 shows a signaling diagram that illustrates a scenario during which various enhancements for reduced capability (redcap) devices may be implemented according to various exemplary embodiments.

FIG. 4 shows a signaling diagram 400 that illustrates a scenario during which various enhancements for redcap devices may be implemented. However, the exemplary embodiments are not limited to the scenario depicted in the signaling diagram 400. Each of the exemplary techniques described herein may be utilized in conjunction with other currently implemented redcap mechanisms, future implementations of redcap mechanisms or independently from other redcap mechanisms.

The signaling diagram 400 includes the UE 110 and the gNB 120A. In 405, the UE 110 receives a signal from the gNB 120A. For example, the signal may be a master information block (MIB), a synchronization signal (SS), a physical broadcast channel (PBCH) payload, a system information block (SIB), downlink control information (DCI), a reference signal or any other signal that may be received by a UE that is not in the radio resource control (RRC) connected state. As will be described in more detail below, this signal may indicate to the UE 110 whether redcap device access is barred for cell access by the gNB 120A and/or a frequency band.

In 410, the UE 110 performs an access barring check. Those skilled in the art will understand that an access barring procedure may be triggered when the UE 110 wants to transition to the RRC connected state or in response to any other appropriate type of condition. In the signaling diagram 400, it is assumed that the gNB 120A is configured to provide network access to redcap UEs. However, if the access barring check indicated to the UE 110 that the UE 110 is barred from camping on the gNB 120A, the UE 110 may search for a different cell and/or frequency band that is configured to provide access for redcap devices.

As mentioned above, in one aspect, the exemplary embodiments relate to introducing techniques for access control of redcap devices. In one technique, a MIB may be configured to indicate whether a redcap device type is barred from the cell and/or frequency band. For example, a sparse bit in the MIB payload may be repurposed to indicate that the cell and/or frequency band is barred for redcap UEs. When the bit is set to a first value (e.g., 0), it may indicate that a redcap device type is barred from camping on the cell and/or frequency. When the bit is set to a second value (e.g., 1), it may indicate that the cell and/or frequency are configured to provide access to a redcap device type. The sparse bit may be repurposed as a "RedcapCellBarred" information element (IE) or any other appropriate type of indication. Thus, within the context of the signaling diagram 400, the RedcapCellBarred IE may be received in 405 as part of a MIB and provide, at least in part, the basis for the access barring check in 410.

In another technique, PBCH payload may be configured to indicate whether a redcap device type is barred from the cell and/or frequency. For example, a reserved bit in PBCH payload (e.g., a(6), a(7), etc.) may be configured to indicate that the cell and/or frequency band is barred for redcap UEs. When the reserved bit is set to a first value (e.g., 0), it may indicate that a redcap device type is barred from camping on the cell and/or frequency. When the reserved bit is set to a second value (e.g., 1), it may indicate that the cell and/or frequency are configured to provide access to a redcap device type. The reserved bit may be re-interpreted as a "RedcapCellBarred" IE or any other appropriate type of indication. Thus, within the context of the signaling diagram 400, the RedcapCellBarred IE may be received in 405 as part of PBCH payload (e.g., SSB) and provide, at least in part, the basis for the access barring check in 410.

In some embodiments, multiple reserved bits in the PBCH payload may be utilized. A first reserved bit may serve as a RedcapCellBarred IE for redcap device type 1 and a second reserved bit may serve as a RedcapCellBarred IE for redcap device type 2. In another example, when a redcap device type may be equipped with either 1-RX antenna branch or 2-RX branches, a first reserved bit may serve as a RedcapCellBarred IE for a redcap device type with 1-RX antenna branch and a second reserved bit may serve as a RedcapCellBarred IE for a redcap device type with 2-RX antenna branches.

In another technique, DCI may be configured to indicate whether a redcap device type is barred from the cell and/or frequency. For example, in DCI format 1_0 (which may be used to schedule SIB messages), there may be 15 reserved bits with cyclic redundancy check (CRC) scrambled by system information (SI)-radio network temporary identifier (RNTI). One or more of the 15 reserved bits in DCI format 1_0 may be configured to indicate that the cell and/or frequency is barred for redcap UEs. When the reserved bit is set to a first value (e.g., 0), it may indicate that a redcap device type is barred from camping on the cell and/or frequency. When the reserved bit is set to a second value (e.g., 1), it may indicate that the cell and/or frequency is configured to provide access to a redcap device type. Like the example provided above, multiple bits may be utilized, each for a different redcap device type and/or number of RX antenna branches on the UE 110 side. Within the context of the signaling diagram 400, an indication that the gNB 120A is configured to provide access to redcap UEs may be received in 405 via DCI format 1_0 and provide, at least in part, the basis for the access barring check in 410.

Figure 5:
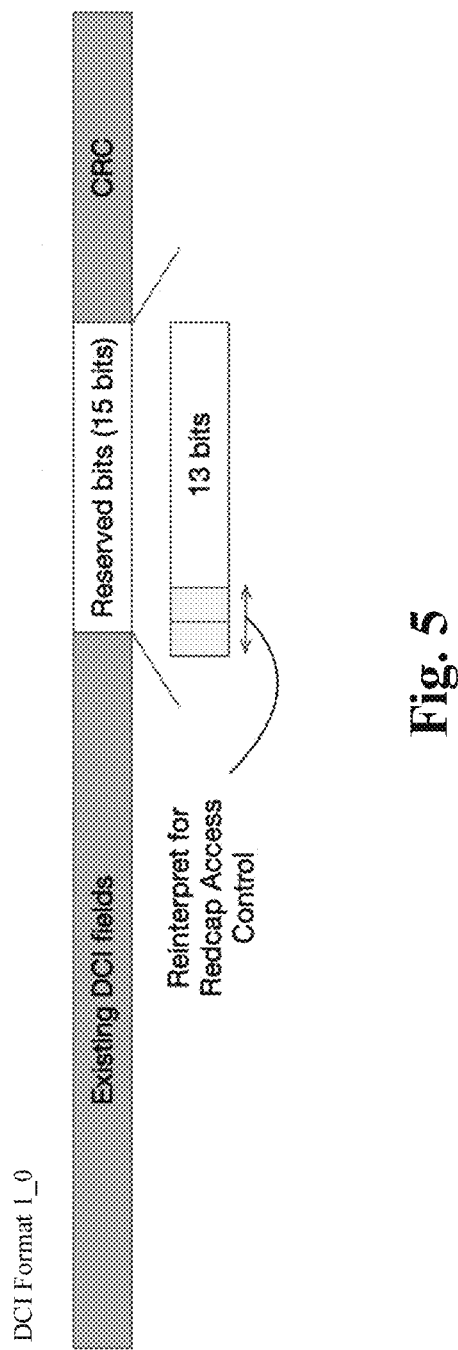
FIG. 5 illustrates an example of downlink control information (DCI) format 1_0 configured for redcap device access control according to various exemplary embodiments.

FIG. 5 illustrates an example of DCI format 1_0 configured for redcap device access control. In this example, 2 out of the 15 reserved bits are to be considered for redcap access control. One advantage of the DCI format 1_0 approach is that the UE 110 may stop SIB1 acquisition once DCI format 1_0 is decoded and the access barring information is known.

In another technique, an IE (e.g., RedcapCellBarred IE or similar indication) may be added to SIB1 as an extension. When the IE is set to a first value (e.g., 0), it may indicate that a redcap device type is barred from camping on the cell and/or frequency. When the IE is set to a second value (e.g., 1), it may indicate that the cell and/or frequency is configured to provide access to redcap UEs or a particular redcap device type. Within the context of the signaling diagram 400, the IE may be received in 405 as part of SIB1 and provide, at least in part, the basis for the access barring check in 410.

In another technique, an implicit indication based on one or more conditions may be utilized. For example, the UE 110 may assume to be barred by the cell and/or frequency band if an initial downlink or uplink bandwidth part (BWP) is configured in SIB1 with a wider bandwidth than the maximum bandwidth supported by the redcap device type and there is no separate downlink or uplink BWP configured in SIB1 for redcap devices. However, if the initial downlink and uplink BWP is equal to the maximum bandwidth for the redcap device type or there is a separate downlink and uplink BWP for redcap devices, it may indicate that the cell and/or frequency band are configured to provide access to redcap UEs or a particular redcap device type. Within the context of the signaling diagram 400, these conditions may be indicated by a SIB1 received in 405.

After the access barring check, the UE 110 and the gNB 120A may participate in a random access procedure. The signaling diagram 400 shows a 4-step random access procedure (e.g., Msg1, Msg2, Msg3, Msg4). However, the exemplary embodiments are not limited to a 4-step random access procedure. Those skilled in the art will understand how the exemplary embodiments may apply to a 2-step random access procedure (e.g., MsgA, MsgB). To provide an example, techniques described above with regard to Msg1 of the 4-step random access procedure may apply to MsgA of the 2-step random access procedure and techniques described above with regard to Msg3 of the 4-step random access procedure may apply to MsgB of the 2-step random access procedure. In addition, those skilled in the art will understand that each of these messages (e.g., Msg1, Msg2, Msg3, Msg4, MsgA, MsgB) are defined in the 3GPP Standards.

The following description of 415-430 provides a general overview of the signaling exchange for a 4-step random access procedure. Specific examples of exemplary techniques related to a redcap device identifying itself as a redcap device during a random access procedure are provided after the description of 415-430. In 415, the UE 110 transmits Msg1 to the gNB 120A. Msg1 may comprise a PRACH preamble. In 420, the gNB 120A may transmit Msg2 to the UE 110 in response to Msg1. Msg2 may comprise a random access response (RAR) which may include a random access preamble ID (RAPID), a temporary RNTI and an uplink grant scheduling a physical uplink shared channel (PUSCH) (e.g., Msg3). In 425, the UE 110 transmits Msg3 to the gNB 120A over the PUSCH. In 430, the gNB 120A transmits Msg4 to the UE 110. Msg4 may represent a contention resolution message.

As mentioned above, the exemplary embodiments introduce techniques for the UE 110 to identify itself as a redcap device through an early indication (e.g., during the random access procedure, prior to configuring RRC connected mode, etc.). In one approach, the UE 110 may be identified by the network as a redcap device type based on selecting an uplink PRACH resource associated with redcap UEs. For this approach, it is assumed that an initial uplink BWP configured by SIB1 is shared by redcap devices and non-redcap devices.

In some embodiments, a dedicated PRACH resource set for redcap UEs (e.g., random access occasions (ROs), PRACH slots, etc.) and a dedicated PRACH resource set for non-redcap UEs may be frequency division multiplexed (FDM) within the shared initial uplink BWP. Thus, a first portion of the initial uplink BWP may be dedicated for redcap UEs and a second portion of the initial BWP may be dedicated for non-redcap UEs. The redcap device ROs may be indicated to the UE 110 by one or more RRC parameters in SIB1. For example, a first IE (e.g., msg1-FrequencyStart-Redcap) may indicate the starting frequency of the PRACH resource set within the initial uplink BWP for redcap UEs. Other IEs may indicate the number of ROs within the PRACH resource set for redcap UEs, the starting frequency of the PRACH resource set within the initial uplink BWP for non-redcap UEs and the number of ROs within PRACH resource set for the non-redcap UEs. Alternatively, a resource block (RB) offset value may be signaled to indicate the gap between the starting physical resource block (PRB) of the PRACH resource set for redcap UEs and the starting PRB of the initial uplink BWP, the starting PRB or the ending PRB of the PRACH resource set for non-redcap UEs.

To provide an example within the context of the signaling diagram 400, prior to 415 (e.g., 405 or a signal not shown), the UE 110 may receive a SIB1 from the gNB 120A. The SIB1 may indicate that an uplink BWP for the gNB 120A is configured to be shared by redcap UEs and non-redcap UEs. In addition, the SIB1 may include one or more parameters related to the FDM configuration of the dedicated PRACH resources for redcap UEs and the dedicated PRACH resources within the initial BWP for non-redcap UEs. The UE 110 may select a RO from the dedicated PRACH resource set for redcap UEs for the transmission of Msg1 in 415. When the gNB 120A receives Msg1 from the UE 110, the network may infer that the UE 110 is a redcap device type because the RO used for the transmission of Msg1 was configured as a dedicated PRACH resource for redcap UEs. The RO may be selected by the UE 110 based on an association between ROs, SSBs and downlink beams. However, the basis for the selection of the particular redcap PRACH resource is beyond the scope of the exemplary embodiments. Instead, the exemplary embodiments are directed towards the UE 110 identifying itself as a redcap device type by using a PRACH resource for an uplink transmission.

Figure 6:
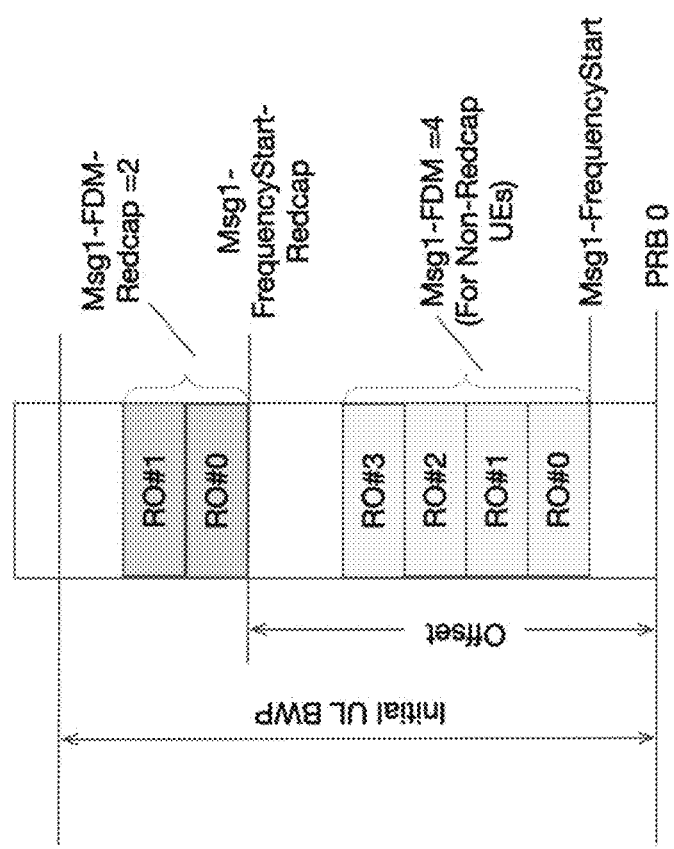
FIG. 6 shows an example of an initial uplink BWP with a dedicated PRACH resource set for redcap UEs and a dedicated PRACH resource set for non-Redcap UEs according to various exemplary embodiments.

FIG. 6 shows an example of an initial uplink BWP with a dedicated PRACH resource set for redcap UEs and a dedicated PRACH resource set for non-Redcap UEs. In this example, both the frequency start indication (e.g., msg1-FrequencyStart-Redcap) and offset (relative to the stating PRB of the initial uplink BWP) are shown. However, in an actual operating scenario, only one of these parameters may be provided. In addition, the parameter "msg1-FDM-Redcap" represents an IE indicating the number of redcap ROs and the parameter "msg1-FDM" represents an IE indicating the number of non-redcap ROs. The FDM technique provides the gNB 120A with flexibility to control the location of the redcap PRACH resources in the frequency domain and the PRACH overhead for redcap devices.

In some embodiments, to minimize RRC signaling overhead, the PRACH resource set for Redcap UEs and the PRACH resource set for non-redcap UEs may have the same PRACH capacity (e.g., number or ROs). This allows for a single parameter indicated in SIB1 (e.g., "Msg1-FDM," etc.) to be used by the UE 110 to determine both the number of ROs in the PRACH resource set for redcap UEs and the number of ROs in the non-redcap PRACH resource set for non-redcap UEs. In addition, to minimize RRC signaling overhead, the PRACH resource for redcap UEs may be mapped consecutively from the last PRB of the PRACH resource set for non-redcap UEs in the frequency domain. Thus, an explicit indication for the starting frequency of the PRACH resource set for redcap UEs (e.g., "msg1-FrequencyStart-redcap," etc.) may not be utilized because the UE 110 may infer the starting PRB from the PRACH resource configuration for non-redcap device.

Continuing with the approach of the UE 110 identifying itself as a redcap device type based on selecting an uplink PRACH resource from a dedicated PRACH resource set for redcap UEs, in some embodiments, the dedicated ROs for redcap UEs and the dedicated ROs for non-redcap UEs may be time division multiplexed (TDM). As mentioned above, for this approach it is assumed that an initial uplink BWP configured by SIB1 is shared by redcap devices and non-redcap devices. Thus, in contrast to the FDM technique where the frequency location of Msg1 (or MsgA) indicated the device type, the TDM technique indicates the device type based on when Msg1 (or MsgA) was transmitted by the UE 110.

Figure 7:
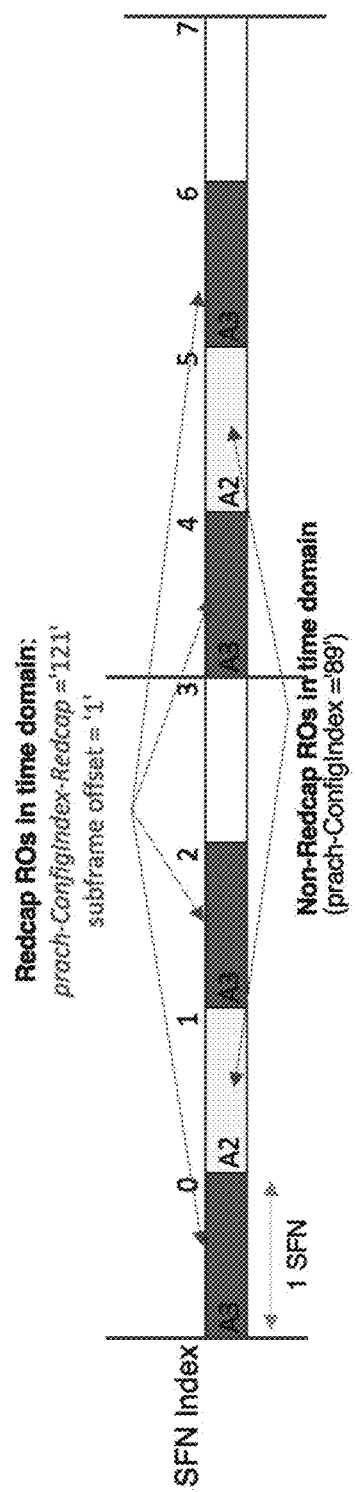
FIG. 7 shows an example of a TDM dedicated PRACH resource set for redcap UEs and a dedicated PRACH resource set for non-redcap UEs according to various exemplary embodiments.

FIG. 7 shows an example of a TDM dedicated PRACH resource set for redcap UEs and a dedicated PRACH resource set for non-redcap UEs according to various exemplary embodiments. In this example, the PRACH preamble format A3 is configured for the redcap ROs and PRACH preamble format A2 is configured for the non-redcap ROs. Thus, in FIG. 7, subframe number (SFN) index 0, 2, 4 and 6 are shown to include redcap ROs and SFN index 1 and 5 are shown to include non-redcap ROs. It may be beneficial to provide the network with the flexibility to enable different PRACH preamble formats or different time domain RO densities for redcap devices and non-redcap devices. For example, there may be scenarios in which there are different RACH load requirements for redcap and non-redcap devices.

During operation, a first PRACH configuration index value may be provided to the UE 110 to indicate the PRACH format for non-redcap UEs and a second PRACH configuration index value may be provided to the UE 110 to indicate the PRACH format for the redcap UEs. In FIG. 7, these parameters are identified as "prach-ConfigurationIndex" and "prach-ConfigurationIndex-redcap." The values shown in FIG. 7 refer to a mapping to a 3GPP TS 38.211 random access configuration. However, the exemplary embodiments are not limited to the example shown in FIG. 7 and any appropriate TDM scheme may be implemented for an initial uplink BWP that is configured for both PRACH resources for redcap UEs and PRACH resources for non-redcap UEs.

In addition, an IE may be provided in SIB1 that represents an offset value for the TDM arrangement. The offset value may be configured to ensure that collisions between redcap ROs and non-redcap ROs are avoided. The offset value may be in units of radio frames (e.g., SFN), subframes, slots or any other appropriate units. In some embodiments, the offset value may be provided while the prach-ConfigIndex-redcap parameter may be absent. In this scenario, the prach-ConfigIndex value may be applied for both redcap and non-redcap UEs to determine the location of their respective ROs in the time domain.

Continuing with the approach of the UE 110 identifying itself as a redcap device based on selecting an uplink PRACH resource from a dedicated PRACH resource set for Redcap UEs, in some embodiments, the preambles within an RO may be split among redcap devices and non-redcap devices.

Figure 8:
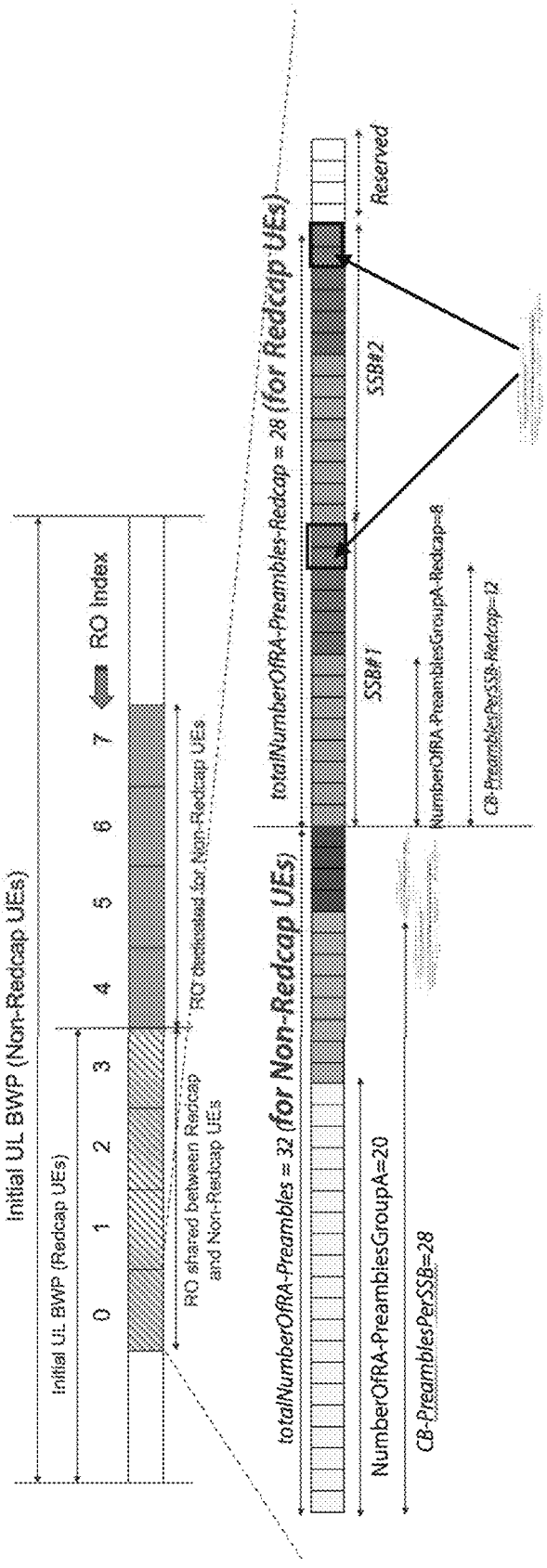
FIG. 8 shows an example of splitting preambles within an random access channel (RACH) occasion (RO) between redcap devices and non-redcap devices according to various exemplary embodiments.

FIG. 8 shows an example of splitting preambles within an RO between redcap devices and non-redcap devices. In FIG. 8, the initial uplink BWP for non-redcap UEs overlaps the initial uplink BWP for redcap UEs. In this example, it is assumed that there are 8 synchronization signals blocks (SSBs). Those skilled in the art will understand there may be a mapping of SSBs-to-ROs for beam selection. For example, the UE 110 may perform measurements on the SSBs and indicate the selected beam by transmitting on the RO associated with the SSB. Since there are 8 SSBs, 8 ROs are also configured. In this example, non-redcap UEs may use any of the ROs indexed 0-7 where ROs indexed 0-3 are shared with redcap UEs and ROs indexed 4-7 are dedicated for non-redcap UEs. The redcap UEs may use any of the ROs indexed 0-3.

Within an RO that may be used by either redcap UEs or non-redcap UEs (e.g., ROs 0-3), the preambles may be split between redcap UEs and non-redcap UEs. Thus, a first portion of preambles within an RO may be used by redcap UEs and a second different portion of preambles within the RO may be used by non-redcap UEs. In this example, it is assumed that there are 64 preambles. However, this value is merely provided for illustrative purposes and the exemplary embodiments may apply to any appropriate number of preambles within an RO. This parameter may be signaled to the UE 110 via the IE "totalNumberOfRA-Preambles" in SIB1 or in any other appropriate manner.

To provide an example within the context of the signaling diagram 400, prior to 415 (e.g., 405 or a signal not shown), the UE 110 may receive a SIB1 from the gNB 120A. The SIB1 may indicate that an uplink BWP for the gNB 120A is configured to be shared by redcap UEs and non-redcap UEs. In addition, the SIB1 may include one or more parameters related to how preambles within one or more of the ROs are split between redcap UEs and non-redcap UEs. The UE 110 may select a RO configured for redcap devices for the transmission of Msg1 in 415. When the gNB 120A receives Msg1 from the UE 110, the network may infer that the UE 110 is a redcap device type because the RO used for the transmission of Msg1 was configured as a redcap PRACH resource. The RO may be selected by the UE 110 based on an association between ROs, SSBs and downlink beams. However, the basis for the selection of the particular redcap PRACH resource is beyond the scope of the exemplary embodiments. Instead, the exemplary embodiments are directed towards the UE 110 identifying itself as a redcap device type by using a PRACH resource for an uplink transmission (e.g., Msg1, MsgA, etc.).

Figure 9:
FIG. 9 shows a table of an example set of parameters for configuring how preambles within an RO are to be split among redcap device and non-redcap devices according to various exemplary embodiments.

To implement the preamble splitting technique, various parameters are introduced. An example set of IEs and corresponding values within the context of the scenario depicted in FIG. 8 is shown in table 900 of FIG. 9. However, any reference to a particular parameter is merely provided for illustrative purposes. Different network may refer to similar IEs by different names.

The IE "totalNumberofRA-Preambles-Redcap" represents the total number of preambles used by redcap UEs for contention based and contention free random access (e.g., 2-step random access or 4-step random access) relative to the RACH resources defined by RACH-ConfigCommon. The preambles for redcap UEs may start from $n_{RA}+1$, where $n_{RA}$ is the index of the last preamble used by non-redcap UEs in the same RO. In some embodiments, the IE "totalNumberOfRA-Preambles" may indicate the number of preambles for non-redcap devices within an RO that is shared by redcap and non-redcap devices.

Within an RO that is shared by redcap and non-redcap devices, the preamble for each device may be organized in groups (e.g., group A, group B, Contention Free). An example of this grouping is shown in FIG. 8. To enable the grouping for redcap devices, the following parameters may be introduced. The UE "ra-Msg3SizeGroupA-Redcap" is introduced to indicate a transport block size threshold in bits indicating when the UE 110 is to use a preamble from group A for the random access procedure. The IE "numberOfRA-PreamblesGroupA-Redcap" may represent the number of contention based preambles per SSB in group A which also implicitly indicates the number of contention based preamble per SSB available in group B. In other embodiments, an implicit rule may be defined where the relevant IEs, including both "ra-Msg3SizeGroupA" and "numberOfRA-PreamblesGroupA" (if configured by SIB1) are commonly applied for both redcap and non-redcap UEs.

The IE "ssb-perRACH-OCcasionAndCB-PreamblesPerSSB-Redcap" may represent two values. A first value may convey the information about the number of SSBs per RO and the second value indications the number of contention based preambles per SSB. This parameter provides flexibility for the network to associate different preamble numbers for redcap UEs and non-redcap UEs under a same beam (e.g., SSB).

In addition, various parameters are introduced to indicate the coverage enhancement (CE) levels for redcap and non-redcap devices. A reference signal received power (RSRP) threshold for redcap devices (e.g., "RSRP-Threshold-Redcap") may be introduced for redcap UEs in CE to select the preamble resources. In some embodiments, a single IE (e.g., "RSRP-Threshold") may be configured in SIB1 and be commonly applied for both redcap devices and non-redcap devices.

For TDM ROs, there may be a CE mode indication for non-redcap UEs (e.g., "prach-ConfigIndex-CE") and a CE mode indication for redcap UEs (e.g., "prach-ConfigIndex-Redcap-CE"). For FDM ROs, there may be a CE mode indication for non-redcap UEs (e.g., "msg1-FrequencyStart-CE") and a CE mode indication for redcap UEs (e.g., "msg1-FrequencyStart-Redcap-CE"). For splitting preambles within an RO, there may be a CE mode indication for non-redcap UEs (e.g., "totalNumberOfRAPreambles-CE") and a CE mode indication for redcap UEs (e.g., "totalNumberOfRAPreambles-Redcap-CE"). In this example, the preambles for redcap UEs start from $n_{RA}+1$, where $n_{RA}$ is the index of the last preamble used by non-redcap UEs in the same RO, including preambles used for CE indication by non-redcap UEs when consecutive preambles are used for CE indication.

Figure 10:
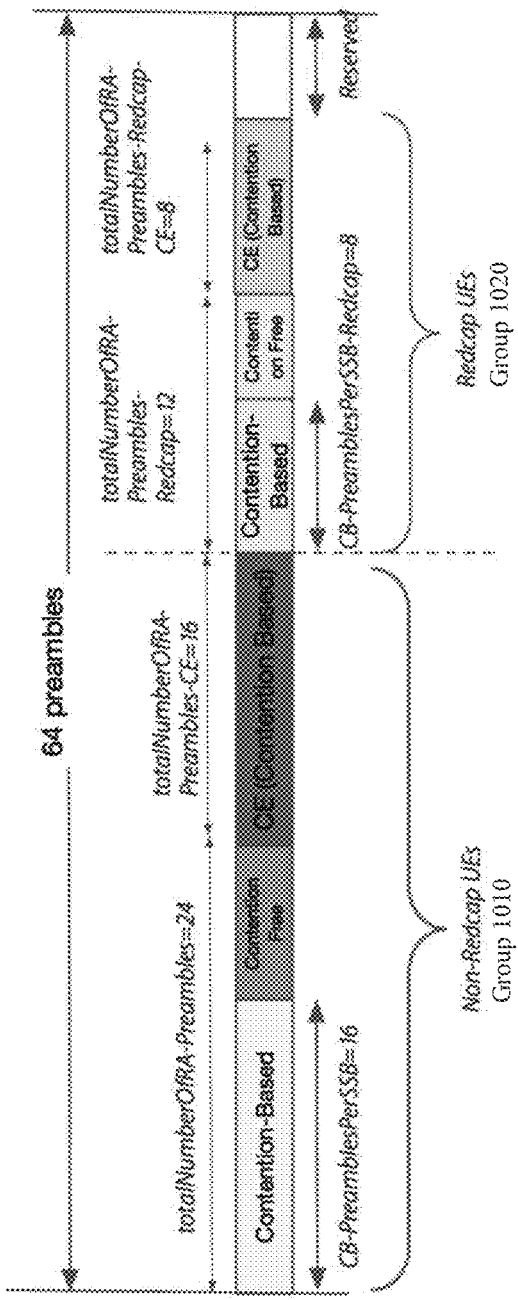
FIG. 10 shows an example of splitting preambles within an RO for identifying redcap devices with and without coverage enhancement (CE) and non-redcap devices with and without coverage enhancement (CE) according to various exemplary embodiments.

FIG. 10 shows an example of splitting preambles within an RO for identifying redcap devices with and without CE and non-redcap devices with and without CE. To enable this functionality, several parameters may be introduced. An example of these parameters and corresponding values within the context of the scenario depicted in FIG. 10 is shown in table 1100 of FIG. 11.

In FIG. 10, it is assumed that there are up to 64 preambles within an RO. The preambles may be split into a first group 1010 for non-redcap UEs and a second group 1020 for redcap UEs. The first group 1010 comprises a set of consecutive preambles for non-redcap UEs using RRC parameters shown in table 1100. In this example, there are 24 preambles for non-redcap UEs without CE as indicated by the parameter "totalNumberofRA-Preambles" and 16 preambles associated with a single SSB for contention based random access as indicated by the parameter "ssb-per-RACH-OccasionAndCB-PreamblesPerSSB." In addition, there are 16 preambles for non-redcap UEs with CE as indicated by the parameter "totalNumberOfRA-Preambles-CE." Therefore, the first group 1010 includes a set of preambles where a first portion of the preambles are for contention based random access by non-redcap UEs without CE, a second portion of the preambles are for contention free random access by non-redcap UEs without CE and a third portion of the preambles are for non-redcap UEs with CE.

The second group 1020 comprises a set of consecutive preambles for redcap UEs using RRC parameters shown in table 1100. In this example, there are 12 preambles for redcap UEs without CE as indicated by the parameter "totalNumberOfRA-Preambles-Redcap" and 8 preambles associated with a single SSB for contention based random access as indicated by the parameter "ssb-perRACH-OccasionAndCB-PreamblesPerSSB-Redcap." In addition, there are 8 preambles for redcap UEs with CE as indicated by the parameter "totalNumberOfRA-Preambles-Redcap-CE." Therefore, the second group 1020 includes a set of preambles where a first portion of the preambles are for contention based random access by redcap UEs without CE, a second portion of the preambles are for contention free random access by redcap UEs without CE and a third portion of the preambles are for redcap UEs with CE.

The exemplary embodiments also introduce techniques for early indication of redcap device type that are not based on the selected PRACH resource. In one technique, a redcap device type indicator may be introduced for Msg3 payload. For example, a bit flag may be added to the Msg3 payload that indicates whether the device is a redcap device or a non-redcap device.

In another technique, instead of using any bits in the Msg3 payload, a dedicated logical channel ID (LCID) may be introduced that identifies a device type. The LCID may be configured for the medium access control (MAC) service data unit (SDU) that is used for Msg3. For example, a redcap UE may indicate in the common control channel (CCCH) a unique LCID value for redcap devices. A non-redcap UE may indicate in the CCH a LCID associated with non-redcap devices.

The exemplary embodiments also introduce techniques for enabling and disabling the early indication of redcap UEs. In one technique, the presence of a dedicated redcap PRACH resource configuration in SIB1 (ROs or preambles), may indicate whether the early indication of redcap device type is enabled. Alternatively, a new flag IE (e.g., "enableMsg3Indicator") may be introduced in SIB1 and may be used to enable Msg3 early indication. In some embodiments, the flag IE may be used when a dedicated redcap PRACH resource configuration is not present in SIB1.

In some embodiments, frequency hopping for physical uplink control channel (PUCCH) transmission and PUSCH transmission during initial access or random access procedure may be disabled for redcap UEs. This may be implemented to avoid uplink resource segmentation.

EXAMPLES

In a first example, a processor of a base station is configured to perform operations comprising transmitting a system information block (SIB) to one or more user equipments (UEs) and receiving an indication of a reduced capability (redcap) device type from a UE during a random access procedure, wherein the indication is associated with a UE configuration comprising one or more UE complexity reduction features.

In a second example, the processor of the first example, the operations further comprising determining that the UE is associated with a reduced maximum bandwidth based on the indication, wherein the reduced maximum bandwidth is the only UE complexity reduction feature associated the indication.

In a third example, the processor of the first example, the operations further comprising transmitting, prior to receiving the indication of the redcap device type, a signal comprising an indication of whether the redcap device type is barred for cell access from the base station.

In a fourth example, the processor of the third example, wherein the signal is one of the SIB, a master information block (MIB), physical broadcast channel (PBCH) payload or downlink control information (DCI).

In a fifth example, the processor of the first example, wherein the SIB indicates that an initial uplink bandwidth part (BWP) is to be shared by redcap devices and non-redcap devices.

In a sixth example, the processor of the fifth example, wherein the initial uplink BWP comprises a set of dedicated redcap random access channel (RACH) occasions (ROs) and a set of dedicated non-redcap ROs multiplexed in a frequency division multiplex (FDM) manner.

In a seventh example, the processor of the sixth example, where the SIB includes one or more information elements (IEs) indicating a frequency location of the dedicated redcap ROs within the initial uplink BWP and a frequency location of the dedicated non-redcap ROs within the initial uplink BWP.

In an eighth example, the processor of the sixth example, wherein the SIB includes an information element (IE) indicating a resource block (RB) offset value that is to provide the basis for redcap UEs to determine a frequency location of the dedicated redcap ROs relative to a starting RB of the dedicated non-redcap ROs within the initial uplink BWP.

In a ninth example, the processor of the sixth example, wherein a single information element (IE) provides an indication of a number of ROs in the set of dedicated redcap ROs and a number of ROs in the set of dedicated non-redcap ROs.

In a tenth example, the processor of the fifth example, wherein the initial uplink BWP comprises a set of dedicated redcap random access channel (RACH) occasions (ROs) and a set of dedicated non-redcap ROs multiplexed in a time division multiplex (TDM) manner.

In an eleventh example, the processor of the tenth example, wherein the SIB includes an information element (IE) indicating a physical random access channel (PRACH) configuration index value specific to the redcap device type.

In a twelfth example, the processor of the tenth example, wherein the SIB includes an information element (IE) indicating a physical random access channel (PRACH) configuration index value that is to be applied by both redcap UEs and non-redcap UEs and wherein the SIB further includes an IE indicating an offset value for determining a time domain location of the dedicated redcap ROs and dedicated non-redcap UEs.

In a thirteenth example, the processor of the fifth example, wherein the initial uplink BWP comprises one or more random access channel (RACH) occasions (ROs) that are to be shared by redcap UEs and non-redcap UEs, each of the one or more ROs comprising a set of dedicated redcap preambles and a set of dedicated non-redcap preambles.

In a fourteenth example, the processor of the thirteenth example, wherein the SIB includes an information element (IE) indicating a total number of preambles assigned for redcap device type contention based random access and contention free random access.

In a fifteenth example, the processor of the thirteenth example, wherein the set of dedicated redcap preambles is configured in three separate groups and wherein the SIB comprises one or more information element (IEs) indicating a number of preambles in a first group, a number of preambles in a second group, a number of synchronization signal blocks (SSBs) per RO and a number of contention based preambles per SSB.

In a sixteenth example, the processor of the thirteenth example, wherein the set of dedicated redcap preambles comprises a number of preambles dedicated for a redcap UE operating in coverage enhancement (CE) mode.

In a seventeenth example, the processor of the first example, wherein the indication of the redcap device type is an information element (IE) received as part of message 3 (Msg3) payload during the random access procedure.

In an eighteenth example, the processor of the first example, wherein the indication of the redcap device type is a unique logical channel ID (LCID) provided as part of message 3 (Msg3) during the random access procedure.

In a nineteenth example, the processor of the first example, wherein the SIB includes an indication of dedicated redcap physical random access channel (PRACH) resources.

In a twentieth example, the processor of the first example, wherein the SIB includes an information element (IE) indicating that the indication of the redcap device type is to be provided in message 3 (Msg3).

In a twenty first example, the processor of the first example, wherein frequency hopping for physical uplink control channel (PUCCH) transmissions and physical uplink shared channel (PUSCH) transmissions is disabled during the random access procedure.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a base station configured to perform operations comprising:
    transmitting a system information block (SIB) to one or more user equipments (UEs), wherein a first bit of the SIB is configured to indicate whether a redcap device type equipped with a single receive (RX) antenna branch is barred for cell access by the base station and a second bit of the SIB is configured to indicate whether a redcap device type equipped with two RX antenna branches is barred for cell access by the base station; and
    receiving an indication of a reduced capability (redcap) device type from a UE during a random access procedure, wherein the indication is associated with a UE configuration comprising one or more UE complexity reduction features.

2. The processor of claim 1, wherein the one or more UE complexity reduction features associated with the indication comprises a reduced maximum bandwidth.

3. The processor of claim 1, the operations further comprising:
    receiving, after receiving the indication of the redcap device type, UE capability information comprising further UE complexity reduction features.

4. The processor of claim 1, the operations further comprising:
    transmitting a physical broadcast channel (PBCH) payload comprising one or more bits configured to indicate whether the redcap device type is barred for cell access by the base station.

5. The processor of claim 1, wherein the SIB indicates that an initial uplink bandwidth part (BWP) is to be shared by redcap devices and non-redcap devices.

6. The processor of claim 5, wherein the initial uplink BWP comprises a set of dedicated redcap random access channel (RACH) occasions (ROs) and a set of dedicated non-redcap ROs multiplexed in a frequency division multiplex (FDM) manner.

7. The processor of claim 6, where the SIB includes one or more information elements (IEs) indicating a frequency location of the dedicated redcap ROs within the initial uplink BWP.

8. The processor of claim 6, wherein a single information element (IE) provides an indication of a number of ROs in the set of dedicated redcap ROs and a number of ROs in the set of dedicated non-redcap ROs.

9. The processor of claim 5, wherein the initial uplink BWP comprises a set of dedicated redcap random access channel (RACH) occasions (ROs) and a set of dedicated non-redcap ROs multiplexed in a time division multiplex (TDM) manner.

10. The processor of claim 9, wherein the SIB includes an information element (IE) indicating a physical random access channel (PRACH) configuration index value specific to the redcap device type.

11. The processor of claim 9, wherein the SIB includes an information element (IE) indicating a physical random access channel (PRACH) configuration index value that is to be applied by both redcap UEs and non-redcap UEs and wherein the SIB further includes an IE indicating an offset value for determining a time domain location of the dedicated redcap ROs.

12. The processor of claim 5, wherein the initial uplink BWP comprises one or more random access channel (RACH) occasions that are to be shared by redcap UEs and non-redcap UEs, each of the one or more ROs comprising a set of dedicated redcap preambles and a set of dedicated non-redcap preambles.

13. The processor of claim 12, wherein the SIB includes an information element (IE) indicating a total number of preambles assigned for redcap device type contention based random access and contention free random access.

14. The processor of claim 12, wherein the set of dedicated redcap preambles is configured in three separate groups and wherein the SIB comprises one or more information element (IEs) indicating a number of preambles in a first group, a number of preambles in a second group, a number of synchronization signal blocks (SSBs) per RO and a number of contention based preambles per SSB.

15. The processor of claim 12, wherein the set of dedicated redcap preambles comprises a number of preambles dedicated for a redcap UE operating in coverage enhancement (CE) mode.

16. The processor of claim 1, wherein the indication of the redcap device type is a unique logical channel ID (LCID) provided as part of message 3 (Msg3).

17. The processor of claim 1, wherein the SIB includes one of (i) an indication of dedicated redcap physical random access channel (PRACH) resources for random access or (ii) an information element (IE) indicating that the indication of the redcap device type is to be provided in message 3 (Msg3).

18. A base station, comprising:
a transceiver configured to communicate with one or more user equipments (UEs); and
a processor communicatively coupled to the transceiver and configured to perform operations comprising:
transmitting a system information block (SIB) to the one or more UEs, wherein a first bit of the SIB is configured to indicate whether a redcap device type equipped with a single receive (RX) antenna branch is barred for cell access by the base station and a second bit of the SIB is configured to indicate whether a redcap device type equipped with two RX antenna branches is barred for cell access by the base station; and
receiving an indication of a reduced capability (redcap) device type from a UE during a random access procedure, wherein the indication is associated with a UE configuration comprising one or more UE complexity reduction features.

* * * * *